United States Patent [19]

Miyazaki et al.

[11] Patent Number: 5,670,205

[45] Date of Patent: Sep. 23, 1997

[54] COLOR FILTER MANUFACTURING METHOD AND APPARATUS, COLOR FILTER, LIQUID CRYSTAL DISPLAY DEVICE, AND APPARATUS HAVING LIQUID CRYSTAL DISPLAY APPARATUS

[75] Inventors: Takeshi Miyazaki, Ebina; Hiroshi Sato, Yokohama; Katsuhiro Shirota, Inagi; Hideto Yokoi; Akio Kashiwazaki, both of Yokohama; Shoji Shiba, Sagamihara, all of Japan

[73] Assignee: Canon Kabushiki Kaisha, Tokyo, Japan

[21] Appl. No.: 412,577

[22] Filed: Mar. 29, 1995

[30] Foreign Application Priority Data

Mar. 31, 1994 [JP] Japan ................................. 6-063412
Mar. 16, 1995 [JP] Japan ................................. 7-057224

[51] Int. Cl.$^6$ ........................................................ B05D 5/12
[52] U.S. Cl. ........................... 427/64; 427/162; 427/165; 427/256; 427/287
[58] Field of Search ............................. 427/162, 64, 256, 427/165, 287

[56] References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,608,577 | 8/1986 | Hori | 346/140 |
| 4,723,129 | 2/1988 | Endo et al. | 346/1.1 |
| 4,740,796 | 4/1988 | Endo et al. | 346/1.1 |
| 4,991,030 | 2/1991 | Sato et al. | 358/474 |
| 5,032,713 | 7/1991 | Eguchi et al. | 250/211 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |
| 1217320 | 8/1989 | Japan . |
| 4-261503 | 9/1992 | Japan . |
| 5-60916 | 3/1993 | Japan . |
| WO 93/24240 | 12/1993 | WIPO . |

OTHER PUBLICATIONS

Patent Abstracts of Japan, vol. 13, No. 37 (p–819), 27 Jan. 1989.

Patent Abstracts of Japan, vol. 8, No. 183 (P–296), 23 Aug. 1984.

*Primary Examiner*—Janyce Bell
*Attorney, Agent, or Firm*—Fitzpatrick, Cella, Harper & Scinto

[57] ABSTRACT

It is an object of the present invention to provide a color filter manufacturing method which can make the color density of a filter uniform. In order to achieve the object, according to the present invention, there is provided a color filter manufacturing method for a color filter manufactured by forming and arranging a large number of colored filter elements on a transparent substrate, including the first discharge step of discharging a colored droplet of a first volume onto each filter element formation region on the substrate so as to form each of the filter elements, and the second discharge step of discharging a droplet of a second volume smaller than the first volume onto a position on the substrate where the droplet of the first volume has been discharged.

14 Claims, 16 Drawing Sheets

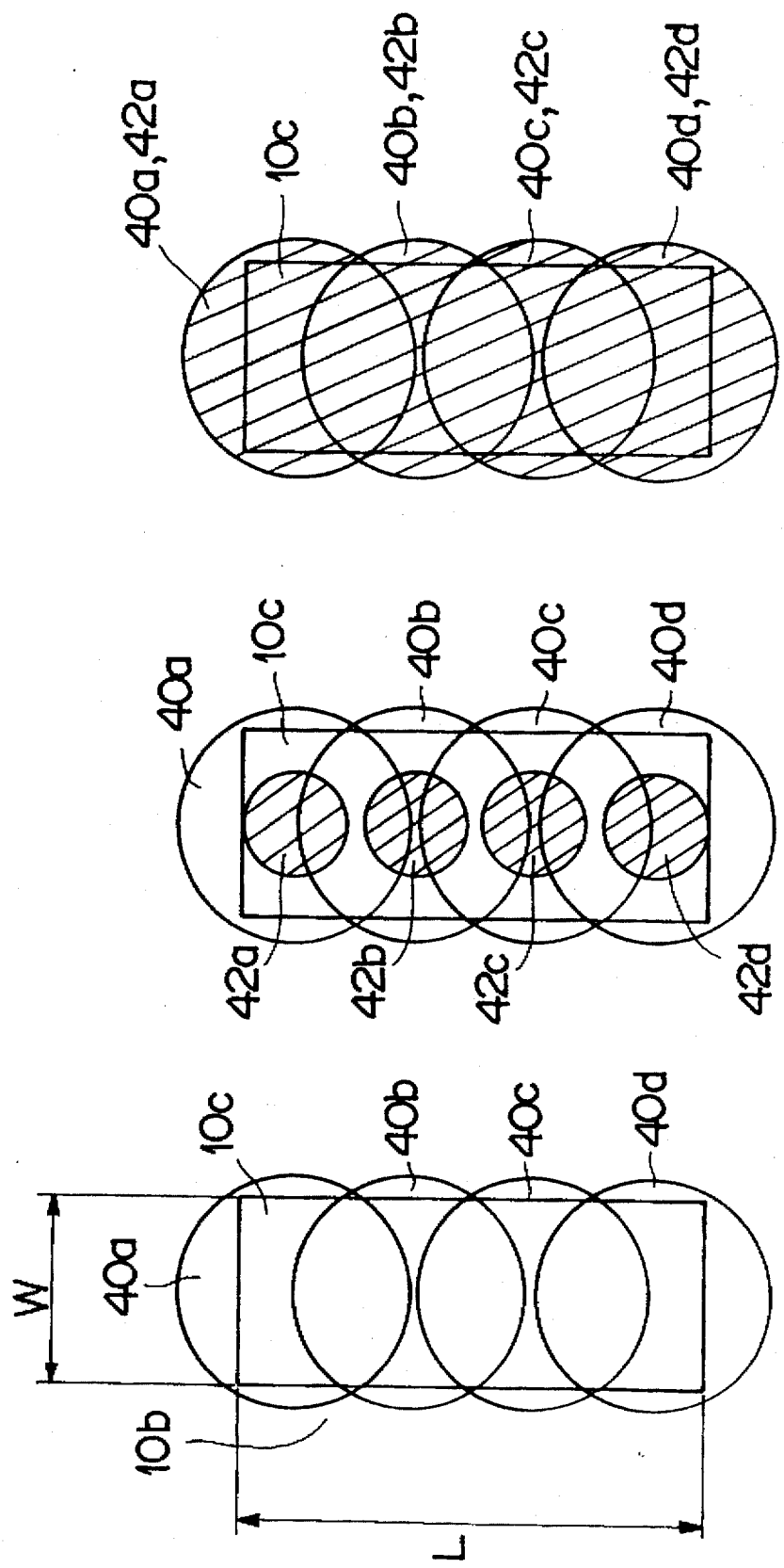

COLOR FILTER MANUFACTURING METHOD AND APPARATUS, COLOR FILTER, LIQUID CRYSTAL DISPLAY DEVICE, AND APPARATUS HAVING LIQUID CRYSTAL DISPLAY APPARATUS

BACKGROUND OF THE INVENTION

1. Field of the Invention

The present invention relates to a method and apparatus for manufacturing a color filter by forming and arranging a large number of colored filter elements on a transparent substrate, the color filter, a liquid crystal display apparatus, and an apparatus having the liquid crystal display apparatus.

2. Description of the Related Art

With recent advances in personal computers, especially portable personal computers, the demand has arisen for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, no method capable of satisfying all the requirements has been established. The respective methods will be described below. The first method is a dyeing method discussed, which is the most popular method. In the dyeing method, a water-soluble polymer material as a dyeable material is coated on a glass substrate, and the coating is patterned into a desired shape by a photolithography process. The obtained pattern is dipped in a dye bath to obtain a colored pattern. This process is repeated three times to form R, G, and B color filter layers.

The second method is a pigment dispersion method, which is currently replacing the dyeing method. In this method, a pigment-dispersed photosensitive resin layer is formed on a substrate and patterned into a single-color pattern. This process is repeated three times to obtain R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a method of dispersing a pigment in a thermosetting resin, performing a print operation three times to form R, G, and B coatings separately, and thermosetting the resins, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, this method cannot be applied to TFTs. In the print method, a pattern with a fine pitch cannot be formed because of poor resolution and poor evenness.

In order to eliminate these drawbacks, methods of manufacturing color filters by an ink-jet system are disclosed in Japanese Patent Laid-Open Nos. 59-75205, 63-235901, and 1-217320.

In the above conventional manufacturing method based on the ink-jet system, since a colored ink dot is formed on a color filter substrate by spraying an ink droplet once, the density of the ink droplet tends to decrease, or color irregularity tends to occur. Even if the amount of ink sprayed is increased, one spraying operation results in blurring and spreading of an ink dot. Therefore, the problem of density irregularity cannot be solved, and a high-definition filter pattern cannot be formed owing to the spread of the ink dot.

In order to solve this problem, an attempt has been made to make the dot density uniform by repeatedly spraying an ink with the same dot diameter instead of spraying an ink only once, as disclosed in, e.g., Japanese Patent Laid-Open No. 4-261503. However, a portion on which an ink has been sprayed once is wettable with respect to an ink. For this reason, if an ink with the same dot diameter is sprayed again, the second ink dot tends to blur. Since the ink dot spreads in this case as well, a high-definition filter pattern cannot be formed either. An ink having a high viscosity may be used to suppress ink blurring. If, however, an ink having a high viscosity is used in the ink-jet system, the stability in discharging the ink deteriorates.

In addition, as disclosed in Japanese Patent Laid-Open No. 5-60916, a method of achieving a uniform density by performing a double print operation using the print method is also known. In the print method, as described above, a pattern with a fine pitch cannot be formed because of poor resolution and poor evenness.

SUMMARY OF THE INVENTION

The present invention has been made in consideration of the above situation, and has as its first object to provide a color filter manufacturing method and apparatus which can reduce the cost of a color filter.

It is the second object of the present invention to provide a color filter manufacturing method and apparatus which can make the color density of a filter uniform.

It is the third object of the present invention to provide a color filter manufacturing method and apparatus which can manufacture a high-definition color filter.

It is the fourth object of the present invention to provide a high-definition, low-cost color filter having a uniform density, a liquid crystal display apparatus using the color filter, and an apparatus having the liquid crystal display apparatus.

In order to solve the above problems and achieve the above objects, a color filter manufacturing method of the present invention is characterized by the following process according to its first aspect.

There is provided a manufacturing method for a color filter manufactured by forming and arranging a large number of colored filter elements on a transparent substrate, comprising the first discharge step of discharging a colored droplet of a first volume onto each filter element formation region on the substrate so as to form each of the filter elements, and the second discharge step of discharging a droplet of a second volume smaller than the first volume onto a position on the substrate where the droplet of the first volume has been discharged.

A color filter manufacturing method of the present invention is characterized by the following process according to its second aspect.

There is provided a manufacturing method for a color filter manufactured by forming and arranging a large number of colored filter elements on a transparent substrate, comprising the first discharge step of discharging a first colored droplet onto each of filter element formation regions on the substrate so as to form each of the filter elements, and the second discharge step of discharging a second droplet containing a coloring material whose composition is different from that of a coloring material in the first droplet onto a position on the substrate where the first droplet has been discharged.

A color filter manufacturing apparatus of the present invention is characterized by the following arrangement according to its first aspect.

There is provided a color filter manufacturing apparatus for manufacturing a color filter by forming and arranging a large number of colored filter elements on a transparent substrate, comprising discharge means for discharging a colored droplet onto the substrate, moving means for moving relative positions of the discharge means and the substrate, and control means for causing the moving means to establish a predetermined positional relationship between the discharge means and the substrate, and then controlling the discharge means and the control means to discharge a droplet of a first volume onto the substrate and discharge a droplet of a second volume smaller than the first volume onto a position where the droplet of the first volume has been discharged.

A color filter manufacturing apparatus of the present invention is characterized by the following arrangement according to its second aspect.

There is provided a color filter manufacturing apparatus for manufacturing a color filter by forming and arranging a large number of colored filter elements on a transparent substrate, comprising discharge means for discharging a colored droplet onto the substrate, moving means for moving relative positions of the discharge means and the substrate, and control means for causing the moving means to establish a predetermined positional relationship between the discharge means and the substrate, and then controlling the discharge means and the control means to discharge a first droplet onto the substrate and discharge a second droplet containing a coloring material whose composition is different from that of a coloring material in the first droplet onto a position where the first droplet has been discharged.

A color filter of the present invention is characterized by the following arrangement according to its first aspect.

There is provided a color filter manufactured by forming and arranging a large number of colored filter elements on a transparent substrate, wherein a colored droplet of a first volume is discharged onto each of filter element formation regions on the substrate to form each of the filter elements, and a droplet of a second volume smaller than the first volume is then discharged onto the droplet of the first volume.

A color filter of the present invention is characterized by the following arrangement according to its second aspect.

There is provided a color filter manufactured by forming and arranging a large number of colored filter elements on a transparent substrate, wherein a first colored droplet is discharged onto each of filter element formation regions on the substrate to form each of the filter elements, and a second droplet containing a coloring material whose composition is different from that of a coloring material in the first droplet is then discharged onto the first droplet.

A liquid crystal display apparatus of the present invention is characterized by the following arrangement according to its first aspect.

There is provided a liquid crystal display apparatus using a color filter manufactured by forming and arranging a large number of colored filter elements on a transparent substrate, comprising a color filter manufactured by discharging a colored droplet of a first volume onto each of filter element formation regions on the substrate to form each of the filter elements, and discharging a droplet of a second volume smaller than the first volume onto the droplet of the first volume, and a substrate opposing the color filter, wherein a liquid crystal compound is sealed between the substrates.

A liquid crystal display apparatus of the present invention is characterized by the following arrangement according to its second aspect.

There is provided a liquid crystal display apparatus using a color filter manufactured by forming and arranging a large number of colored filter elements on a transparent substrate, comprising a color filter manufactured by discharging a first colored droplet onto each of filter element formation regions on the substrate to form each of the filter elements, and then discharging a second droplet containing a coloring material whose composition is different from that of a coloring material in the first droplet onto the first droplet, and a substrate opposing the color filter, wherein a liquid crystal compound is sealed between the substrates.

An apparatus having a liquid crystal display device of the present invention is characterized by the following arrangement according to its first aspect.

There is provided an apparatus comprising the liquid crystal display apparatus defined in claim 37, and image signal output means for outputting an image signal to the liquid crystal display apparatus.

An apparatus having a liquid crystal display device of the present invention is characterized by the following arrangement according to its second aspect.

There is provided an apparatus comprising the liquid crystal display apparatus defined in claim 38, and image signal output means for outputting an image signal to the liquid crystal display apparatus.

Other objects and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 7A, 7B and 7C are views showing how an ink spreads in the second coloring operation;

DETAILED DESCRIPTION OF THE PREFERRED EMBODIMENTS

The preferred embodiments of the present invention will be described in detail below with reference to the accompanying drawings.

(First Embodiment)

Figure 1A:
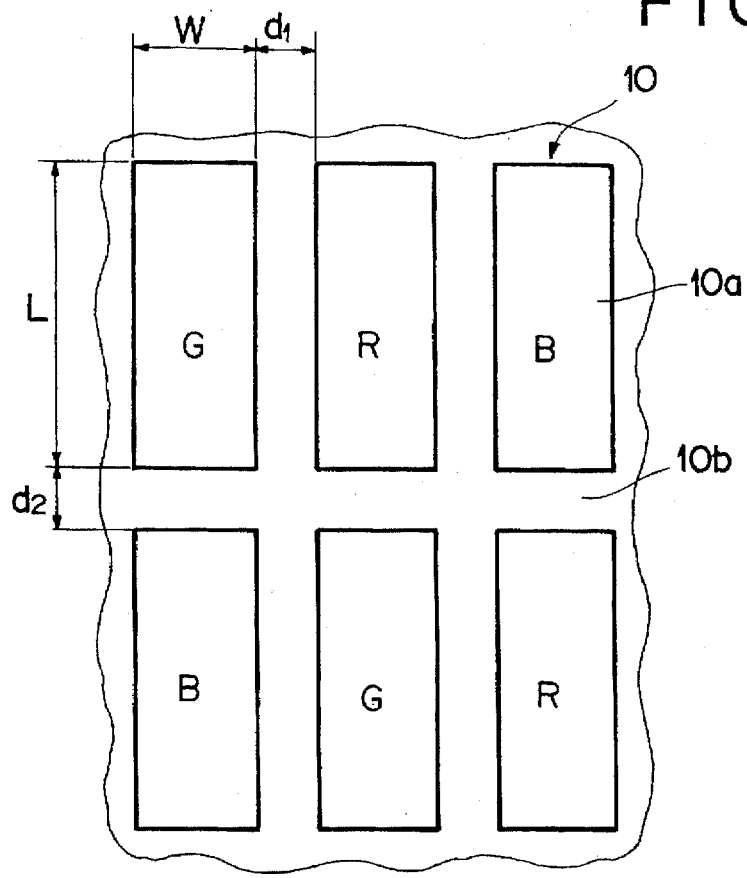
FIGS. 1A and 1B are partial enlarged views showing color filters manufactured by a manufacturing method and apparatus according to the present invention.
Figure 1B:
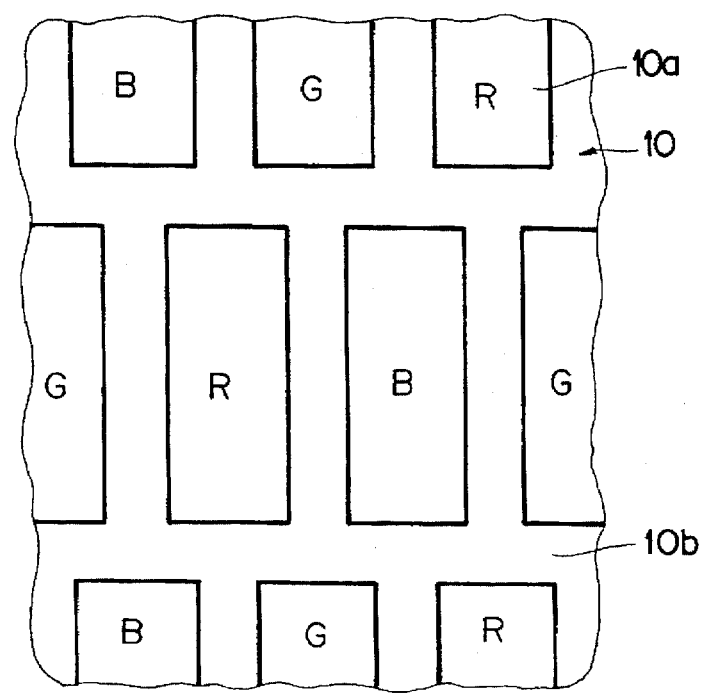

FIGS. 1A and 1B are partial enlarged views of color filters manufactured by a manufacturing method and apparatus according to the present invention.

Each color filter 10 is mounted on the front surface of a color liquid crystal display or the like used for a portable personal computer or the like. As shown in FIG. 1A, filter elements 10a colored in R (red), G (green), and B (blue) are two-dimensionally arranged in a matrix form. In the color filter shown in FIG. 1A, the filter elements 10a are arranged in a simple matrix form. In the color filter shown in FIG. 1B, the filter elements 10a are arranged in a staggered form. A black light-shielding grating 10b is formed between the respective filter elements 10a to make the boundaries between the filter elements 10a clear so as to provide a clear screen.

Figure 2:
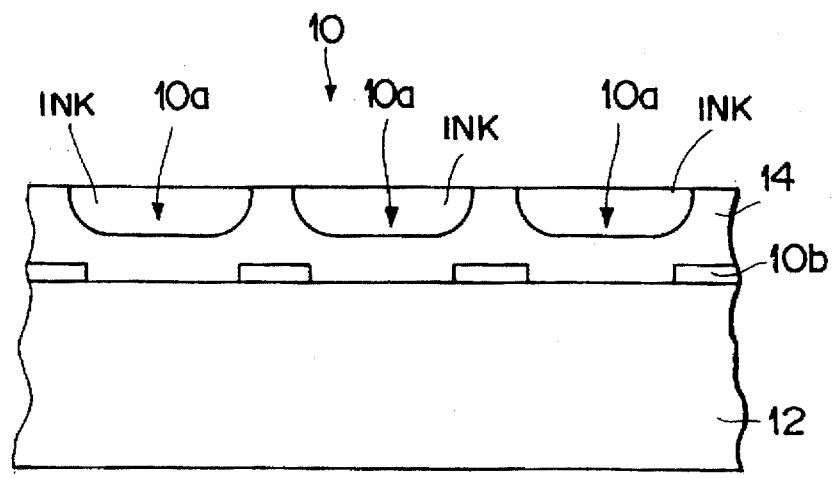
FIG. 2 is a side sectional view showing the color filter in FIG. 1A or 1B.

FIG. 2 is a side sectional view of the color filter 10 in FIG. 1A or 1B. The light-shielding grating 10b is formed on a glass substrate 12 constituting the main body of the color filter 10. The filter elements 10a of the respective colors are formed on the light-shielding grating 10b.

In manufacturing the color filter 10, chromium is deposited on the glass substrate 12 by sputtering, and the resultant film is formed into a matrix pattern by photolithography. This pattern is the light-shielding grating 10b. A layer 14 to be dyed is formed on the light-shielding grating 10b. The layer 14 consists of a cellulose, an acrylic resin, gelatin, or the like and absorbs a fluid. Droplets (to be referred to as an ink hereinafter) containing a coloring material (dye) are sprayed on the filter element formation regions of the layer 14 by a recording head of the ink-jet system. With this process, the layer 14 is colored to form the color filter elements 10a. Note that a pigment or ultraviolet-curing ink may be used instead of a dye. When a pigment or ultraviolet-curing ink is to be used, the layer 14 may not be required.

A protective layer is formed, as needed. As the protective layer, for example, a layer consisting of a resin material of a photo-setting, thermosetting, or photo-setting/thermosetting type, or an inorganic film formed by vapor deposition, sputtering, or the like can be used. Such a layer can be used as long as it exhibits transparency upon formation of a color filter and can withstand the subsequent processes, e.g., an ITO (Indium Tin Oxide) formation process and an aligning film formation process.

Figure 14:
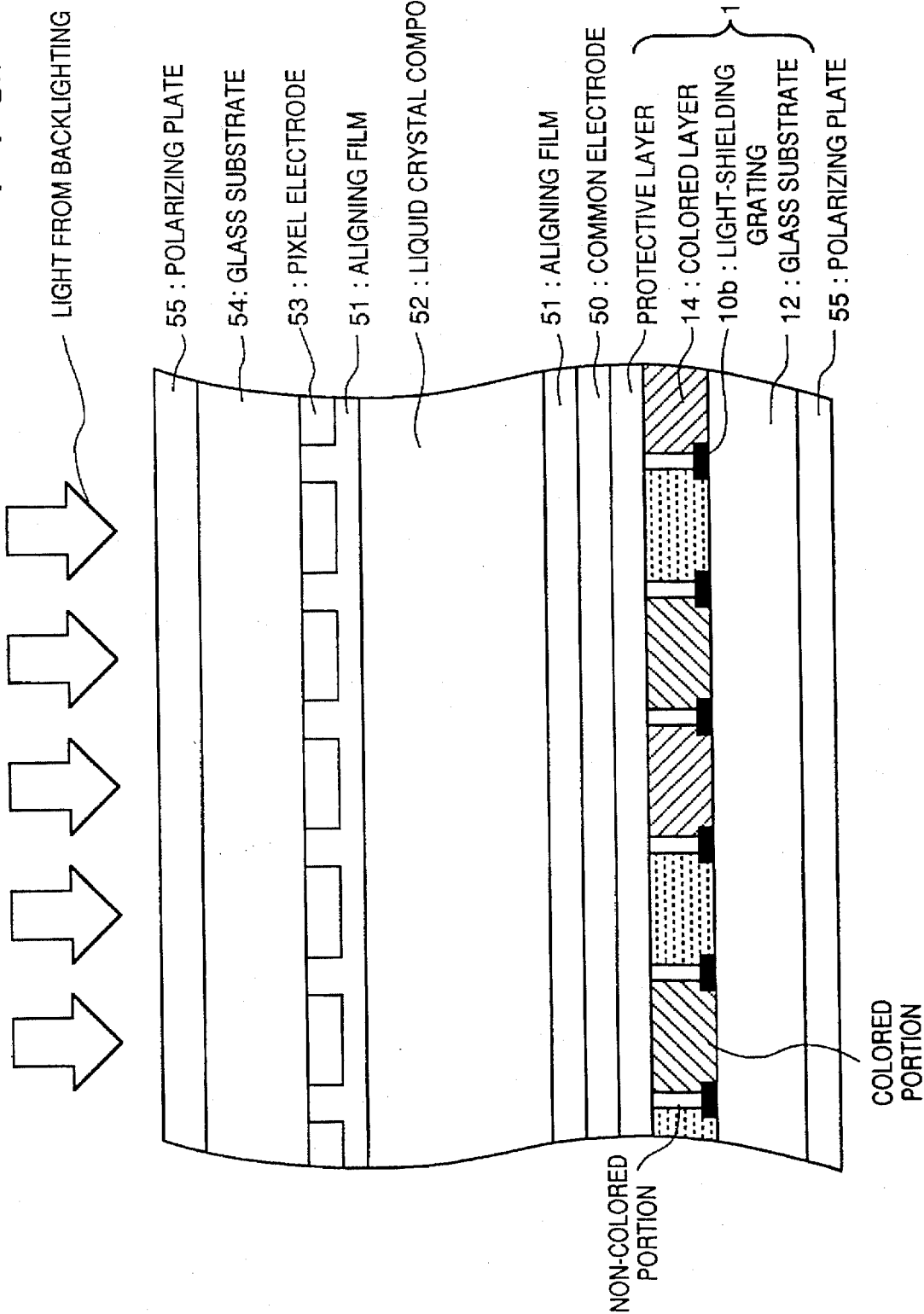
FIG. 14 is a side sectional view showing the structure of a color liquid crystal panel.
Figure 15:
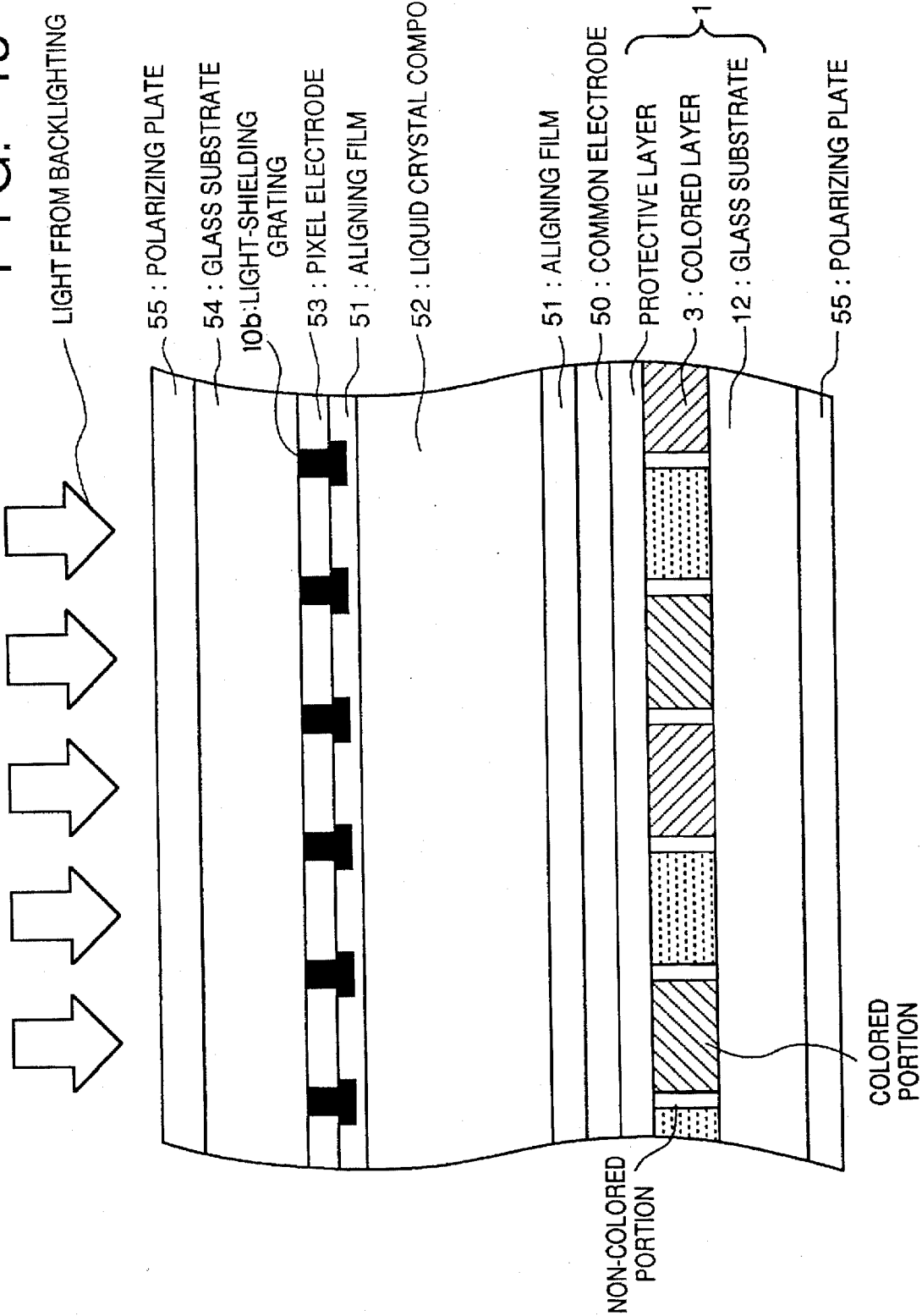
FIG. 15 is a side sectional view showing the structure of a color liquid crystal panel.

In general, a color liquid crystal panel is formed by joining the color filter substrate 12 to a counter substrate 54 and sealing a liquid crystal compound 52 therebetween. TFTs (Thin Film Transistors) (not shown) and transparent pixel electrodes 53 are formed on the inner surface of one substrate 54 of the liquid crystal panel in a matrix form. The color filter 10 is placed on the inner surface of the other substrate 12 such that the R, G, and B coloring materials are positioned to oppose the pixel electrodes. A transparent counter electrode (common electrode) 50 is formed on the entire surface of the color filter 10. The light-shielding grating 10b is generally formed on the color filter substrate 12 side (see FIG. 14). However, in a BM (Black Matrix) con-array type liquid crystal panel, such a grating is formed on the TFT substrate side opposing the color filter substrate (see FIG. 15). Aligning films 51 are formed within the planes of the two substrates. By performing a rubbing process for the aligning films 51, the liquid crystal molecules can be aligned in a predetermined direction. Polarizing plates 55 are bonded to the outer surface of the respective glass substrates. The liquid crystal compound 52 is filled in the gap (about 2 to 5 μm) between these glass substrates. As a blacklight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal panel is applied to an information processing apparatus will be described below with reference to FIGS. 16 to 18.

Figure 16:
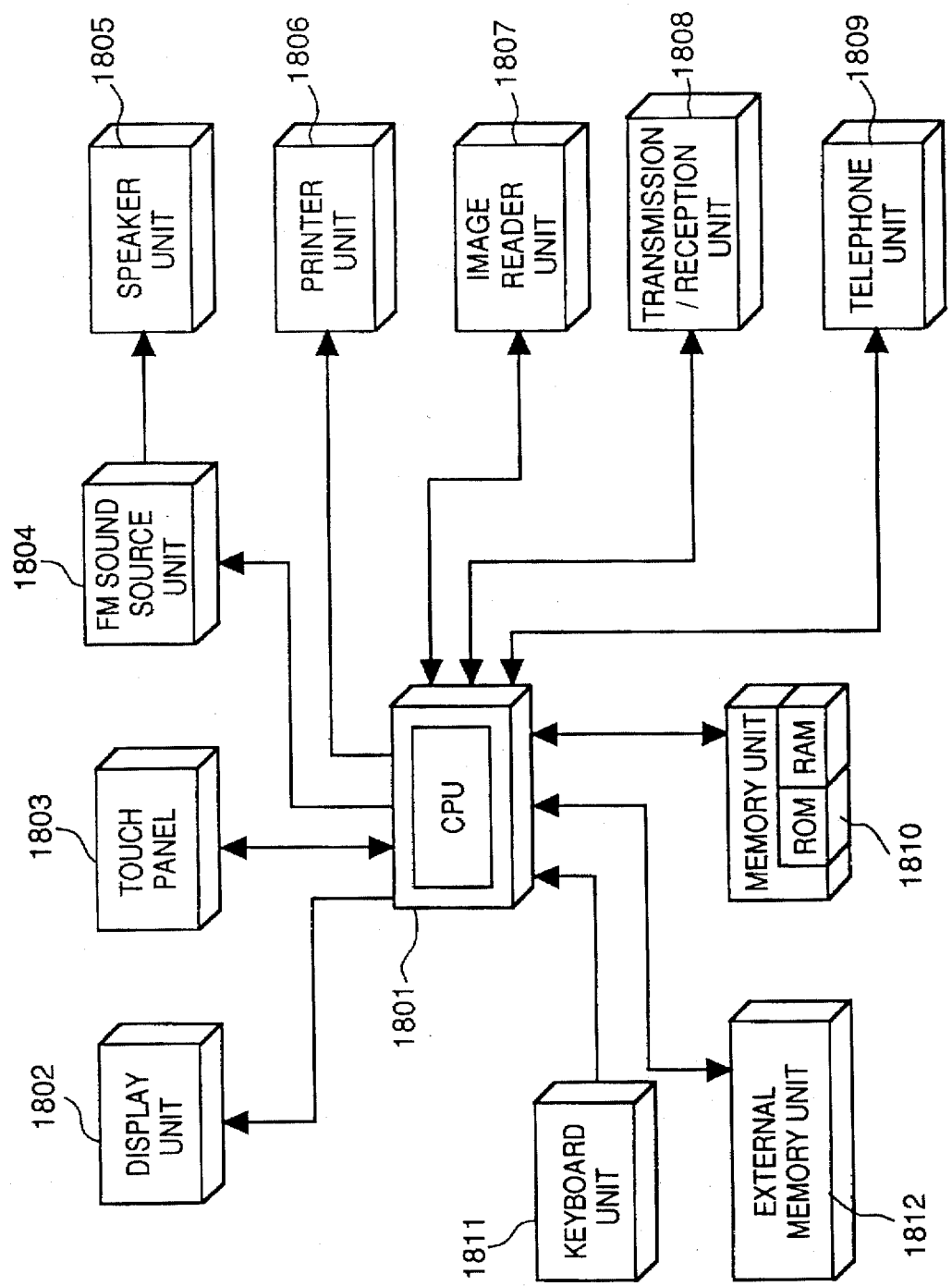
FIG. 16 is a block diagram showing an information processing apparatus using a liquid crystal panel.

FIG. 16 is a block diagram showing the schematic arrangement of an information processing apparatus serving as a wordprocessor, a personal computer, a facsimile apparatus, and a copying machine, to which the above liquid crystal panel is applied.

Referring to FIG. 16, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 17:
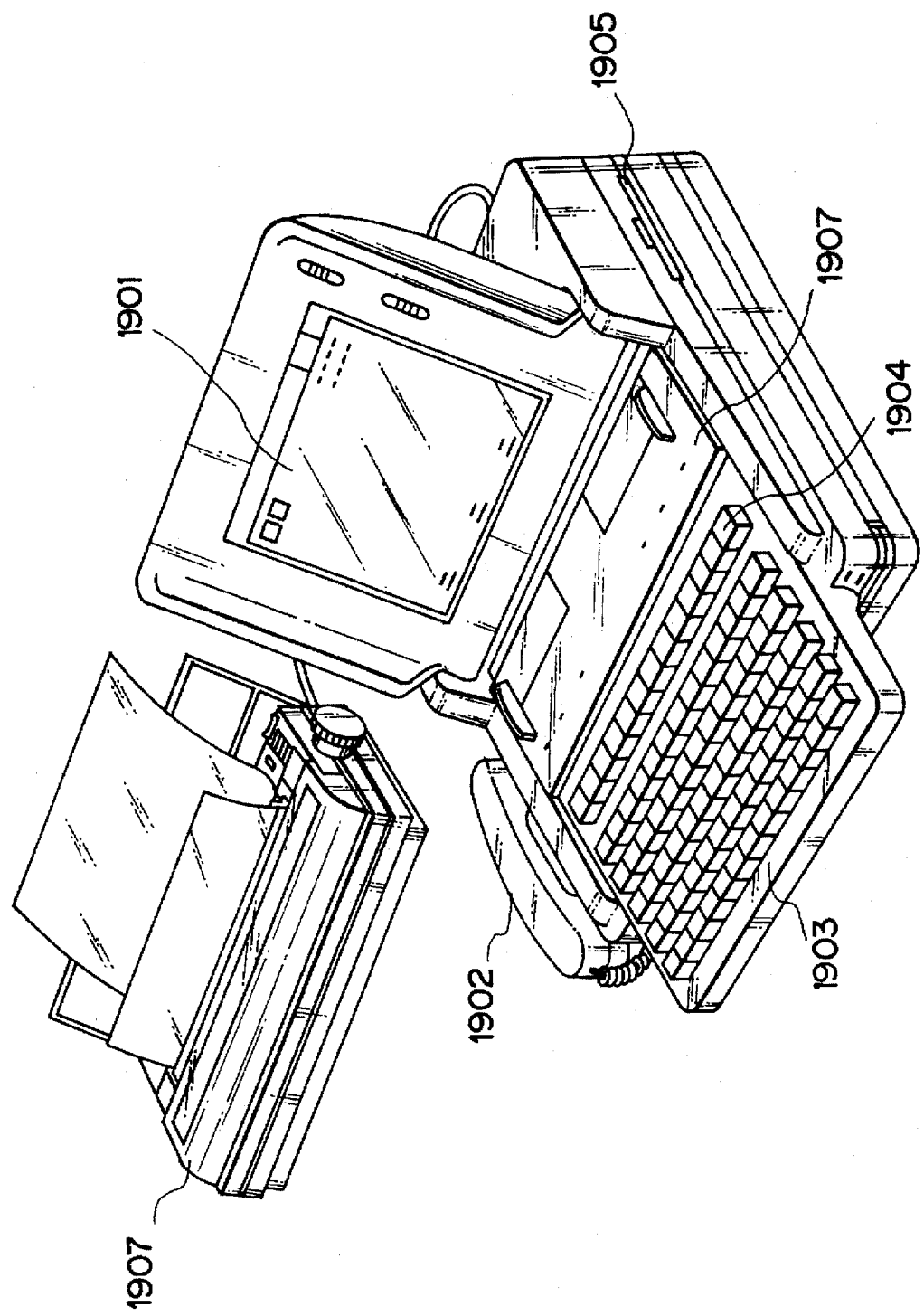
FIG. 17 is a perspective view showing an information processing apparatus using a liquid crystal panel.

FIG. 17 is a perspective view of the information processing apparatus in FIG. 16.

Referring to FIG. 17, reference numeral 1901 denotes a flat panel display using the above liquid crystal panel, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 18:
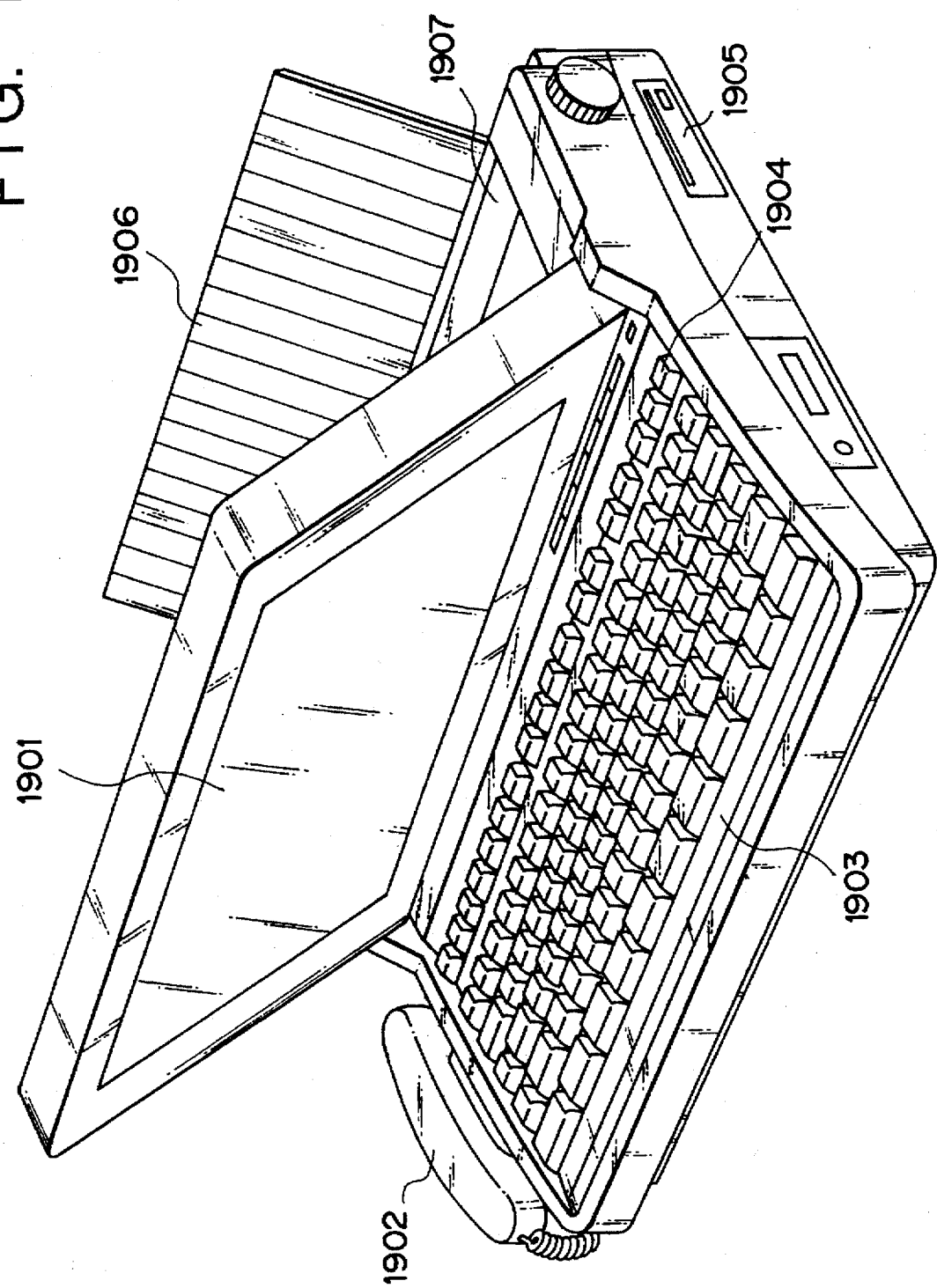
FIG. 18 is a perspective view showing an information processing apparatus using a liquid crystal panel.

Note that the above information processing apparatus may be designed as an integrated apparatus incorporating an ink-jet printer in the main body, as shown in FIG. 18. In this case, the portability of the apparatus can be improved. The same reference numerals in FIG. 18 denote parts having the same functions as those in FIG. 17.

Figure 3:
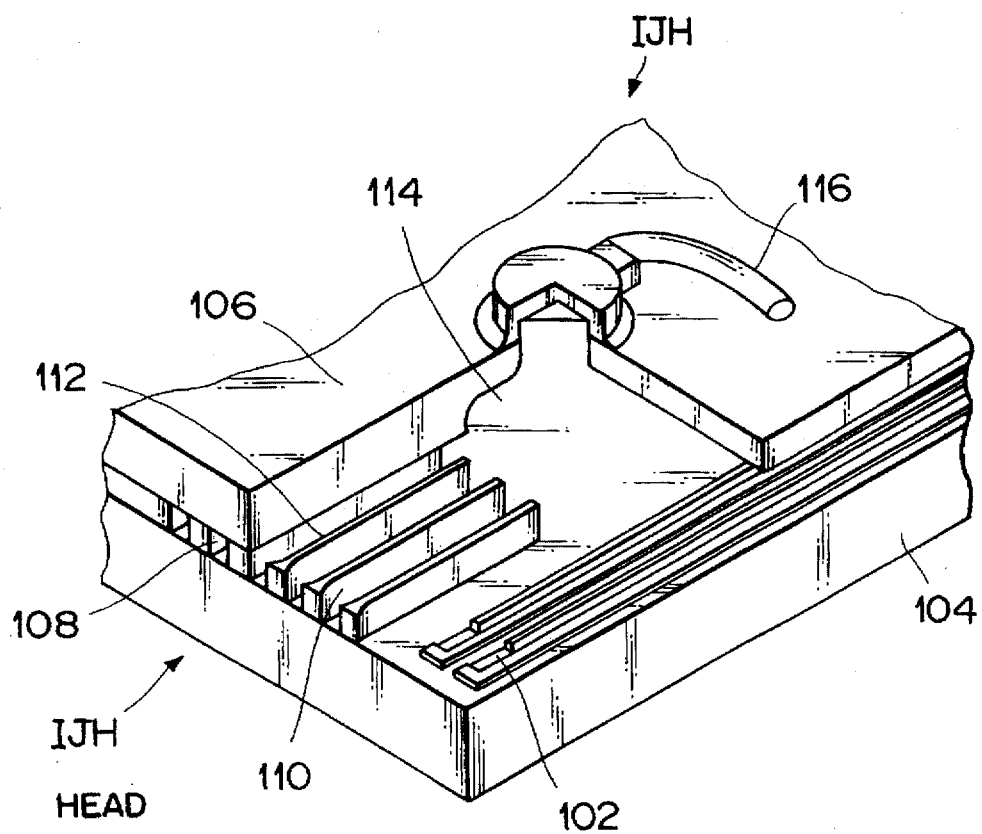
FIG. 3 is a view showing the structure of an ink-jet head IJH for spraying an ink on a layer to be dyed.

FIG. 3 shows the structure of an ink-jet head IJH for spraying ink on the layer 14 in the color filter described above.

Referring to FIG. 3, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 10 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

Figure 4:
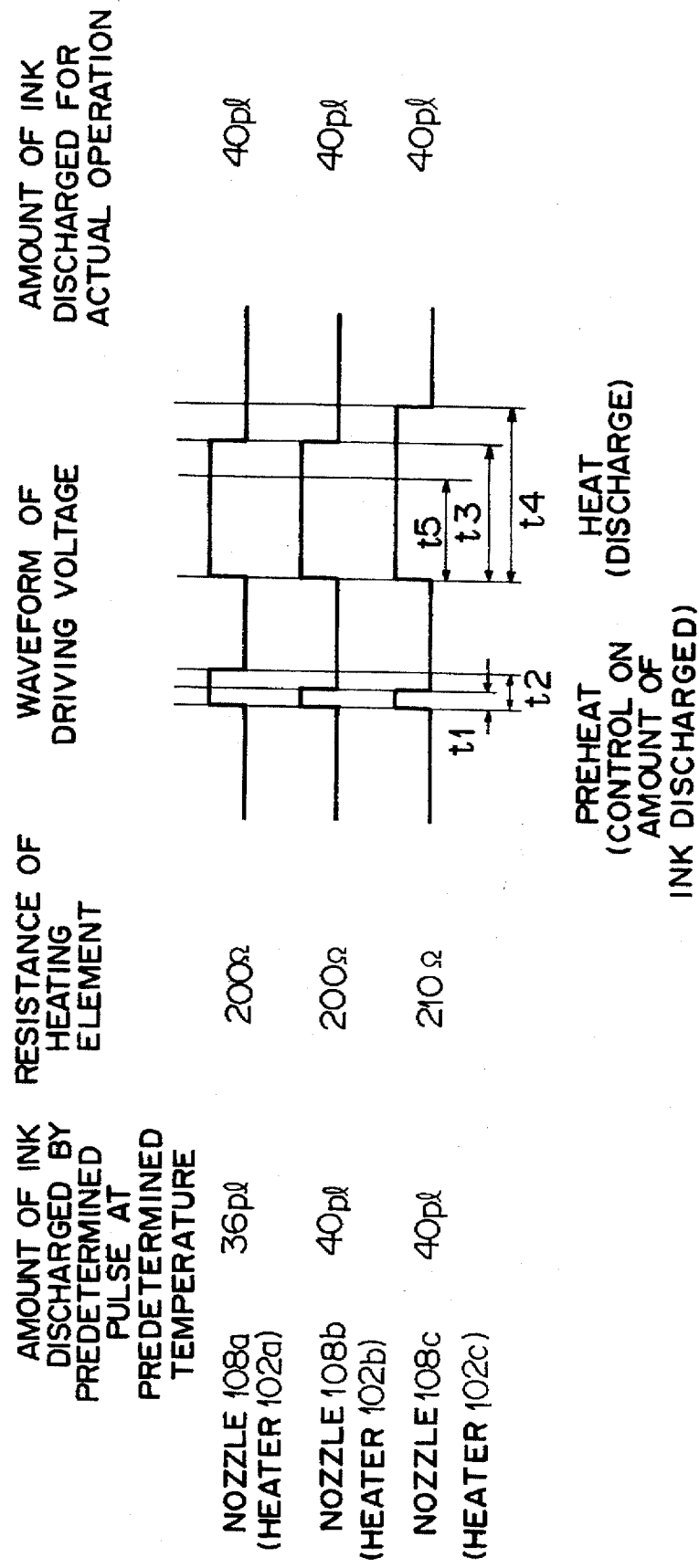
FIG. 4 is a timing chart for explaining a method of controlling the amount of ink discharged by changing power supplied to a heater.

FIG. 4 is a timing chart for explaining a method of controlling the amount of ink discharged by changing power supplied to each heater in this manner.

In this embodiment, two types of constant-voltage pulses are applied to each heater 102 to adjust the amount of ink discharged. The two pulses are a preheat pulse and a main heat pulse (to be simply referred to as a heat pulse hereinafter). The preheat pulse is a pulse for heating an ink to a predetermined temperature before the ink is actually discharged. The pulse width of this pulse is set to be smaller than a minimum pulse width t5 required to discharge the ink. Therefore, the ink is not discharged by this preheat pulse. The preheat pulse is applied to each heater 102 to increase the initial temperature of the ink to a predetermined temperature in advance so as to always make the amount of ink discharged constant when a constant heat pulse is applied to the heater 102 afterward. In contrast to this, the temperature of the ink may be adjusted in advance by adjusting the width of a preheat pulse. In this case, for the same heat pulse, the amount of ink discharged can be changed. In addition, by heating ink before application of a heat pulse, the start time required to discharge the ink upon application of the heat pulse can be shortened to improve the responsiveness.

The heat pulse is a pulse for actually discharging the ink. The pulse width of the heat pulse is set to be larger than the minimum pulse width t5 required to discharge the ink. Energy generated by each heater 102 is proportional to the width (application time) of a heat pulse. Therefore, variations in the characteristics of the heaters 102 can be adjusted by adjusting the width of each heat pulse.

Note that the amount of ink discharged can also be adjusted by adjusting the interval between a preheat pulse and a heat pulse to control the dispersed state of heat upon application of the preheat pulse.

As is apparent from the above description, the amount of ink discharged can be controlled both by adjusting the application time of a preheat pulse and by adjusting the interval between application of a preheat pulse and that of a heat pulse. Therefore, by adjusting the application time of a preheat pulse or the interval between application of a preheat pulse and that of a heat pulse as needed, the amount of ink discharged or the responsibility of discharging of the ink with respect to an applied pulse can be arbitrarily adjusted.

Such adjustment of the amount of ink discharged will be described in detail next.

Assume that an ink is discharged in different amounts from discharging openings (nozzles) 108a, 108b, and 108c upon application of the same voltage pulse, as shown in FIG. 4. More specifically, assume that when a voltage having a predetermined pulse width is applied at a predetermined temperature, the amount of ink discharged from the nozzle 108a is 36 pl (pico-liters); the amount of ink discharged from the nozzle 108b, 40 pl; and the amount of ink discharged from the nozzle 108c, 40 pl, and the resistance of heaters 102a and 102b corresponding to the nozzles 108a and 108b is 200 Ω, and the resistance of a heater 102c corresponding to the nozzle 108c is 210 Ω. Assume that the amounts of ink discharged from the nozzles 108a, 108b, and 108c are to be adjusted to 40 pl. The widths of a preheat pulse and a heat pulse may be adjusted to adjust the amounts of ink discharged from the nozzles 108a, 108b, and 108c to the same amount. Various combinations of the widths of preheat pulses and heat pulses are conceivable. In this case, the amounts of energy generated by heat pulses are made equal for the three nozzles, and the amounts of ink discharged are adjusted by adjusting the widths of preheat pulses.

Since the heaters 102a and 102b for the nozzles 108a and 108b have the same resistance, i.e., 200 Ω, the amounts of energy generated by heat pulses can be made equal by applying voltage pulses having the same width to the heaters 102a and 102b. In this case, the width of each voltage pulse is set to be t3 which is larger than the width t5. An ink is discharged in different amounts, i.e., 36 pl and 40 pl, from the nozzles 108a and 108b upon application of identical heat pulses. In order to increase the amount of ink discharged from the nozzle 108a, a preheat pulse having a width t2 larger than a width t1 of a preheat pulse applied to the heater 102b is applied to the heater 102a. With this operation, the amounts of ink discharged from the heaters 108a and 108b can be adjusted to 40 pl.

The heater 102c for the nozzle 108c has a resistance of 210 Ω, which is higher than the resistance of the two remaining heaters 102a and 102b. For this reason, in order to cause the heater 102c to generate the same amount of energy as that generated by the two remaining heaters, the width of a heat pulse must be set to be larger than that of the above heat pulse. In this case, therefore, the width of the heat pulse is set to be t4 which is larger than the width t3. Since the amounts of ink discharged from the nozzles 108b and 108c upon application of a predetermined pulse are the same, the width of a preheat pulse required is equal to that of a preheat pulse applied to the heater 102b. That is, a preheat pulse having the width t1 is applied to the heater 102c.

In the above manner, the same amount of ink can be discharged from the nozzles 108a, 108b, and 108c which each discharge ink in different amounts upon application of a predetermined pulse. In addition, the amounts of ink discharged may be intentionally made to differ from each other. Note that preheat pulses are used to reduce variations in the discharging operation of each nozzle.

Figure 5:
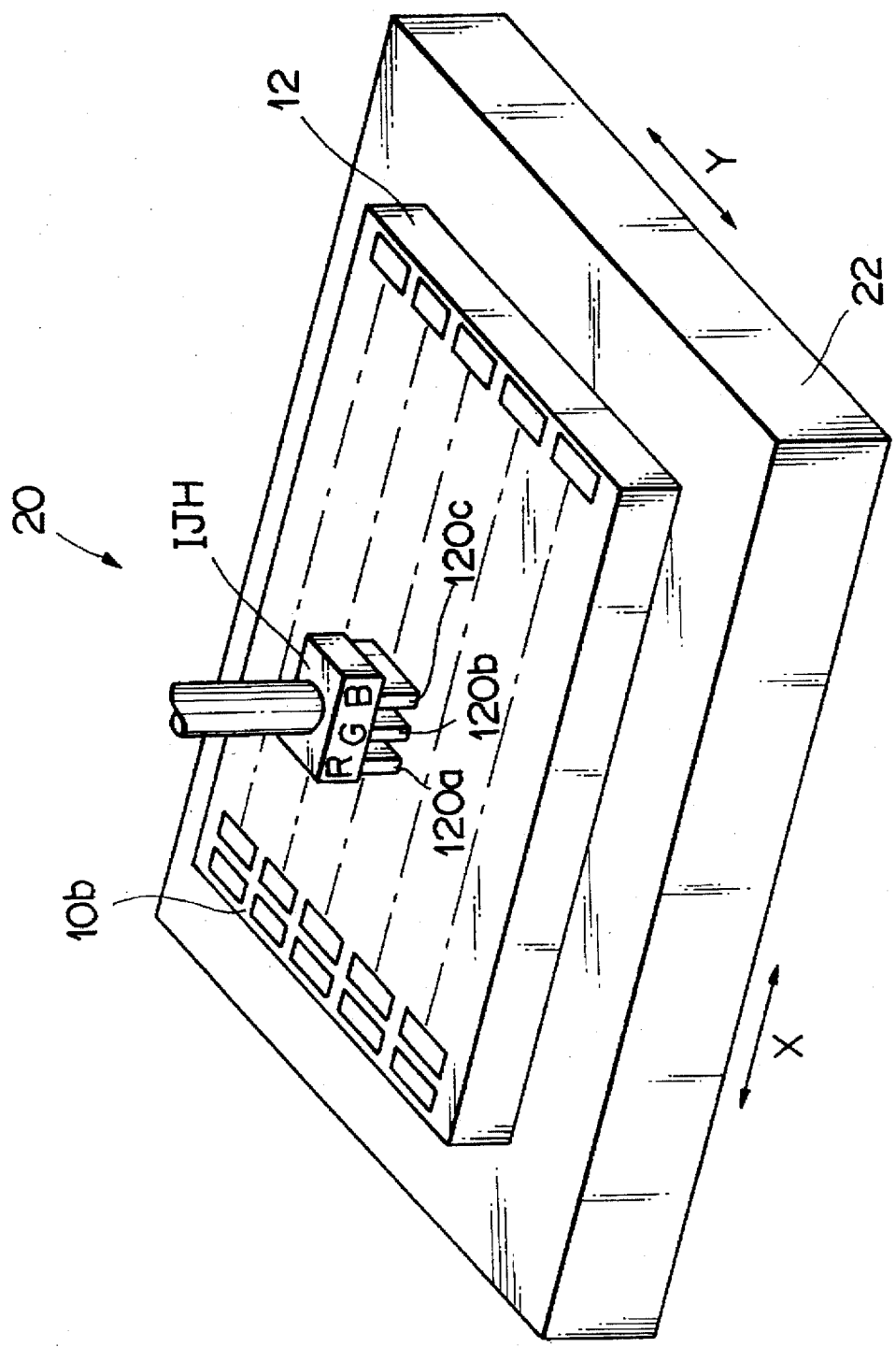
FIG. 5 is a perspective view showing the arrangement of an apparatus for manufacturing the color filter shown in FIGS. 1A or 1B and 2.

FIG. 5 shows the arrangement of an apparatus for manufacturing the color filter shown in FIGS. 1A or 1B and 2.

Referring to FIG. 5, a manufacturing apparatus 20 comprises an X-Y table 22 mounted on a base (not shown) and capable of moving in the X and Y directions in FIG. 5, and an ink-jet head IJH fixed on a base via a support member (not shown) above the X-Y table 22. A glass substrate 12 on which a light-shielding grating 10b and a layer 14 to be dyed (see FIG. 2) are formed by the above method is placed on the X-Y table 22. The ink-jet head IJH includes a red head 120a for discharging a red ink, a green head 120b for discharging a green ink, and a blue head 120c for discharging a blue ink. These heads 120a, 120b, and 120c are designed to discharge inks independently.

In the manufacturing apparatus 20 having the above arrangement, an R (red), G (green), or B (blue) ink is discharged into a desired frame of the light-shielding grating 10b while the X-Y table 22 moves with respect to the ink-jet head IJH in the X and Y directions. In this manner, each frame of the light-shielding grating 10b is colored to complete a color filter.

Figure 6:
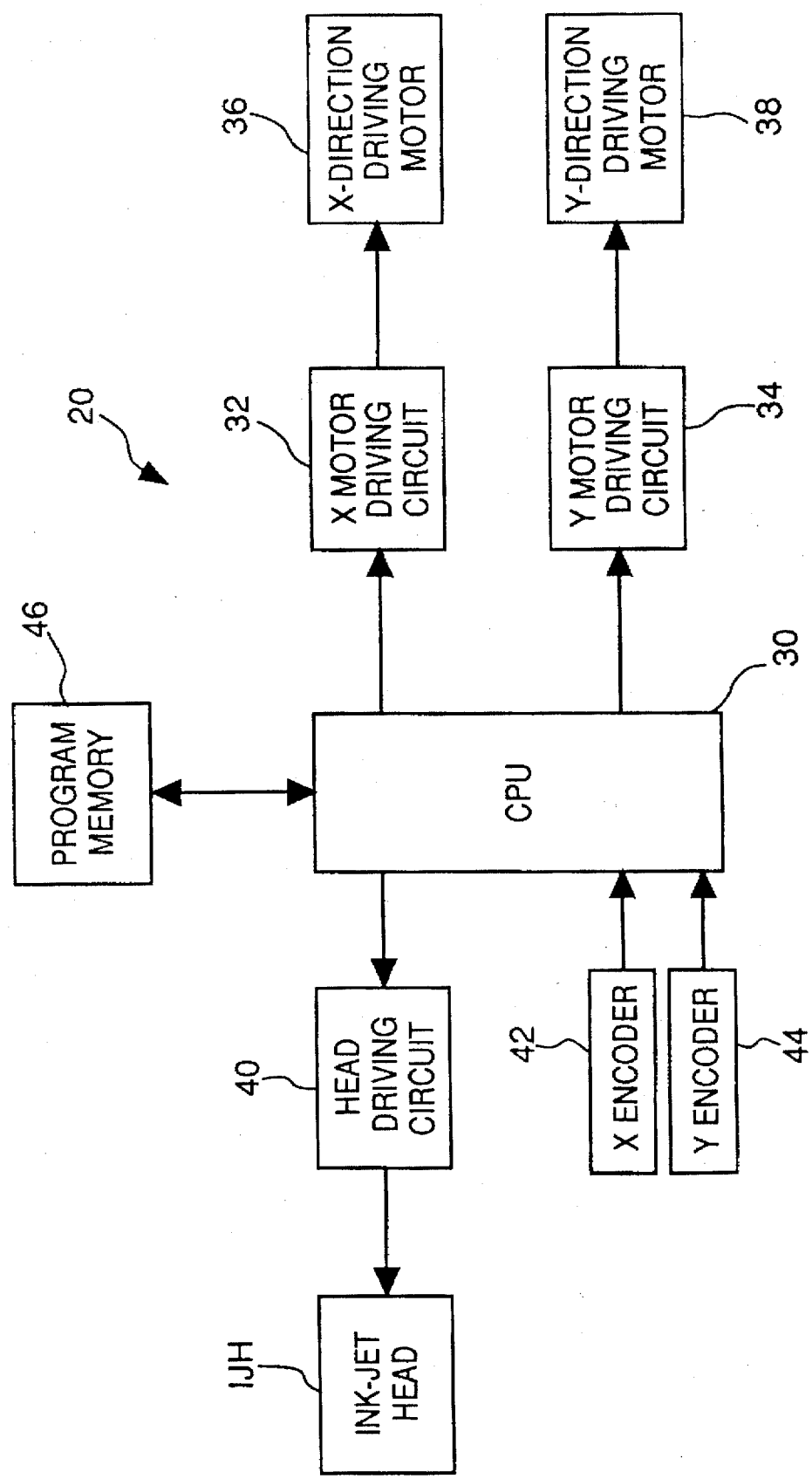
FIG. 6 is a block diagram showing the arrangement of the color filter manufacturing apparatus.

FIG. 6 is a block diagram showing the arrangement of the manufacturing apparatus 20.

Referring to FIG. 6, X- and Y-direction driving motors 36 and 38 for driving the X-Y table 22 in the X and Y directions are connected to a CPU 30 for controlling the overall operation of the manufacturing apparatus 20 via X and Y motor driving circuits 32 and 34. The ink-jet head IJH is also connected to the CPU 30 via a head driving circuit 40. Furthermore, X and Y encoders 42 and 44 for detecting the position of the X-Y table 22 is connected to the CPU 30. With this arrangement, position information on the X-Y table 22 is input to the CPU 30. In addition, a control program in a program memory 46 is input to the CPU 30. The CPU 30 moves the X-Y table 22 in accordance with this control program and position information from the X and Y encoders 42 and 44. With this operation, a desired grating frame on the glass substrate 12 is brought to a position below the ink-jet head IJH, and ink having a desired color is discharged into the frame to color it. A color filter is manufactured by performing this operation for each frame of the light-shielding grating 10b.

Characteristic features of the present invention in coloring a glass substrate will be described next.

Figure 9A:
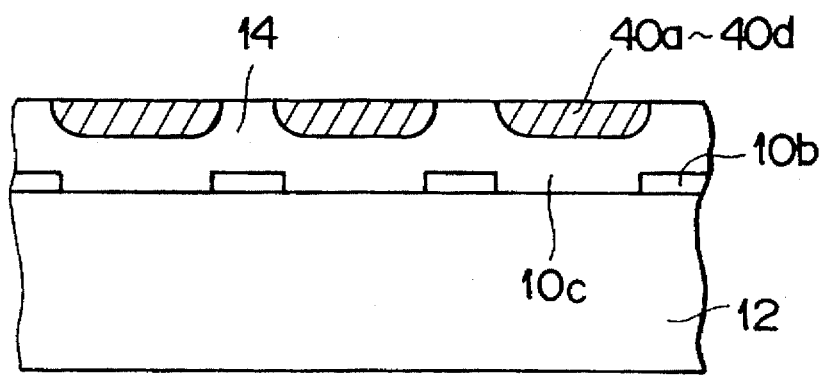
FIGS. 9A, 9B and 9C are sectional views showing how an ink spreads in the second coloring operation.
Figure 9B:
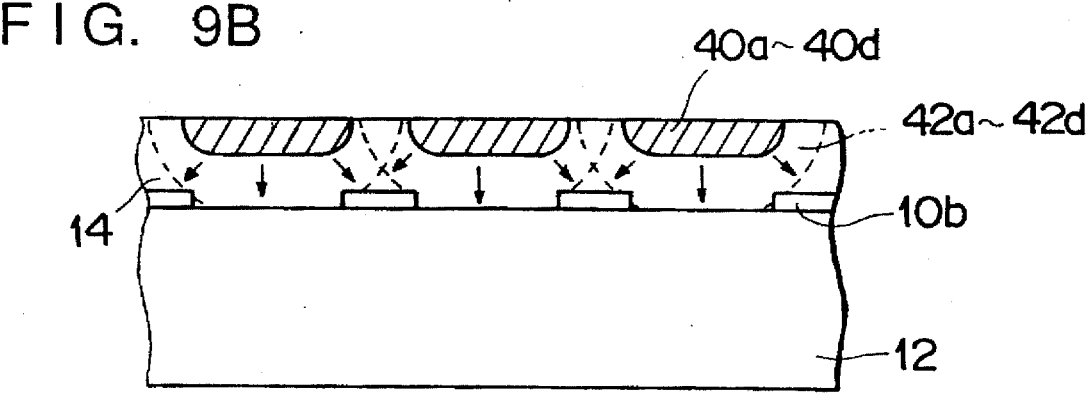

In this embodiment, in spraying ink to color a frame 10c of the light-shielding grating 10b, a plurality of ink dots 40a to 40d are sprayed to cover the entire frame 10c, as shown in FIGS. 7A and 9A. In this case, the volume of each droplet sprayed is set to the first volume which makes the diameter of each of the ink dots 40a to 40d much larger than a width W of the frame 10c. The volume of this droplet is adjusted by controlling a driving pulse applied to each heater 102 in the manner described above. By covering the entire frame 10c with the ink in one spraying operation in this manner, white omissions, which are most unpleasant to look at on a color liquid crystal display, can be prevented.

Figure 8A:
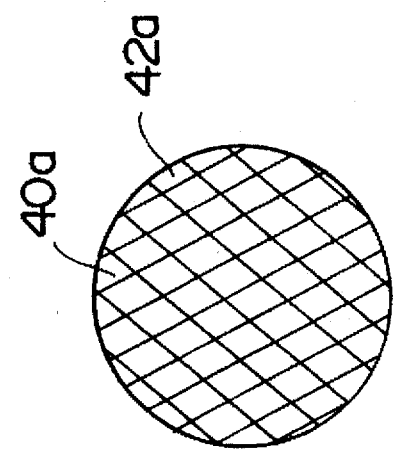
FIGS. 8A, 8B and 8C are views showing how an ink spreads in the second coloring operation.
Figure 8B:
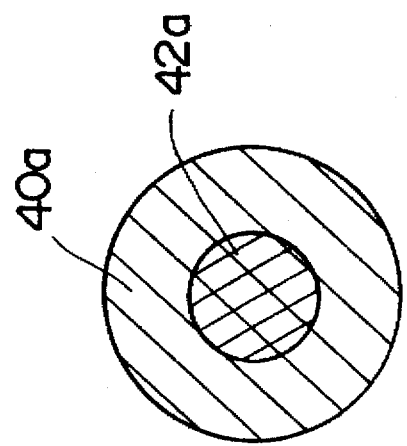
Figure 8C:
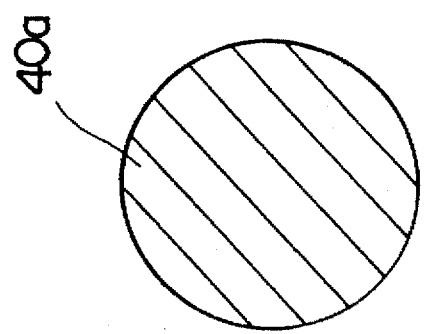
Figure 10C:
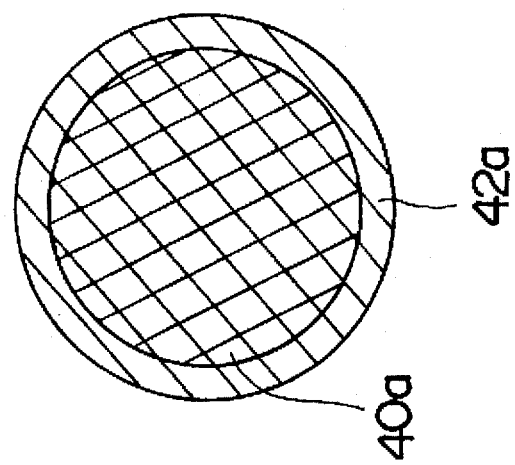
FIGS. 10A, 10B and 10C are views showing how an ink spreads in the second coloring operation.
Figure 10B:
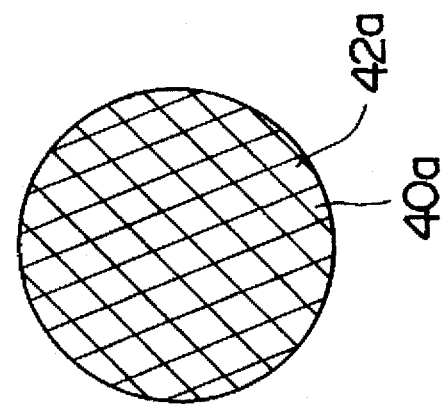
Figure 10A:
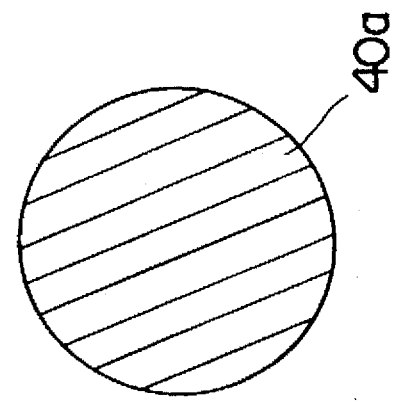

Subsequently, as shown in FIG. 7B, droplets, each having the second volume smaller than the first volume, are sprayed on the ink dots 40a to 40d. Ink dots 42a to 42d are the ones obtained at the moment when the droplets of the second volume are sprayed. The layer 14 on the glass substrate 12 decreases in ability to absorb an ink after one ink spraying operation. For this reason, if ink droplets to be sprayed for the second time have the same volume as that of the ink droplets sprayed for the first time, the second droplets spread and blur more than the first ink dots 40a to 40c. FIGS. 10A to 10C are plan views showing this state. If a droplet having the same volume as that of the first ink droplet 40a in FIG. 10A is sprayed thereon, as shown in FIG. 10B, the second ink dot spreads more than the first ink dot 40a, as indicated by the ink dot 42a in FIG. 10C. If an ink dot spreads in this manner and enters an adjacent frame of the light-shielding grating 10b, interference with the color of the adjacent frame occurs. As a result, a high-definition color filter cannot be formed. For this reason, in this embodiment, the volume of an ink droplet to be sprayed for the second time is set to be smaller than that of and ink droplet to be sprayed for the first time. The second droplets gradually spread from the state shown in FIGS. 7B and 8B which show the state of the droplets at the moment when it is sprayed. Eventually, the second droplets spread up to almost the same size as that of the first ink dots 40a to 40c, as indicated by the ink dots 42a to 42d in FIGS. 7C and 8C. As in the embodiment, therefore, by setting the ink volume for the second spraying operation to be smaller than that for the first spraying operation, blurring of the ink can be minimized to allow the formation of a high-definition color filter. In addition, by spraying the ink twice, color irregularity in a filter can be prevented.

Figure 9C:
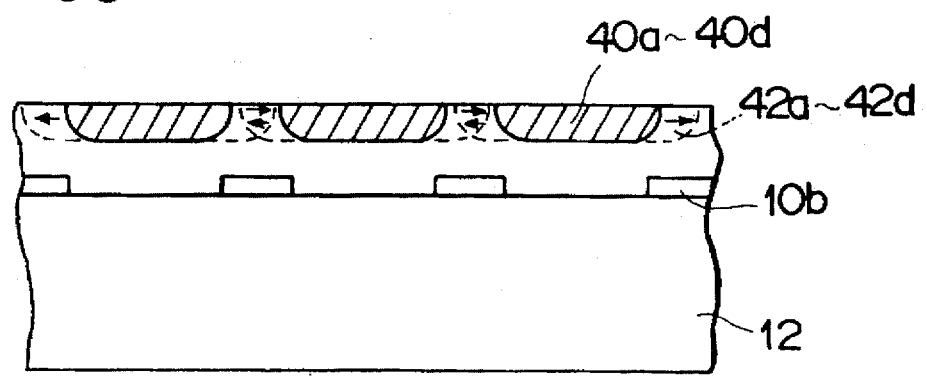

FIG. 9C shows a state wherein the first ink is sprayed and dried first, and the second ink is then sprayed on the first ink. In this case, the second ink does not spread in the direction of thickness of the layer 14, but spreads in the planar direction. Therefore, in this case as well, if the volume of the second ink is set to be equal to that of the first ink, the second ink spreads and blurs.

According to the above description, the volume of the ink sprayed for the second time is set to be smaller than that of the ink sprayed for the first time. Alternatively, the concentration of a coloring material in an ink sprayed for the second time may be changed. The color characteristics of a colored pixel portion can be easily adjusted by changing the concentration of the coloring material in the second ink. Furthermore, the volume of the second ink may be reduced, while the concentration of the coloring material is changed. In this case as well, blurring of an ink can be prevented.

Figure 11:
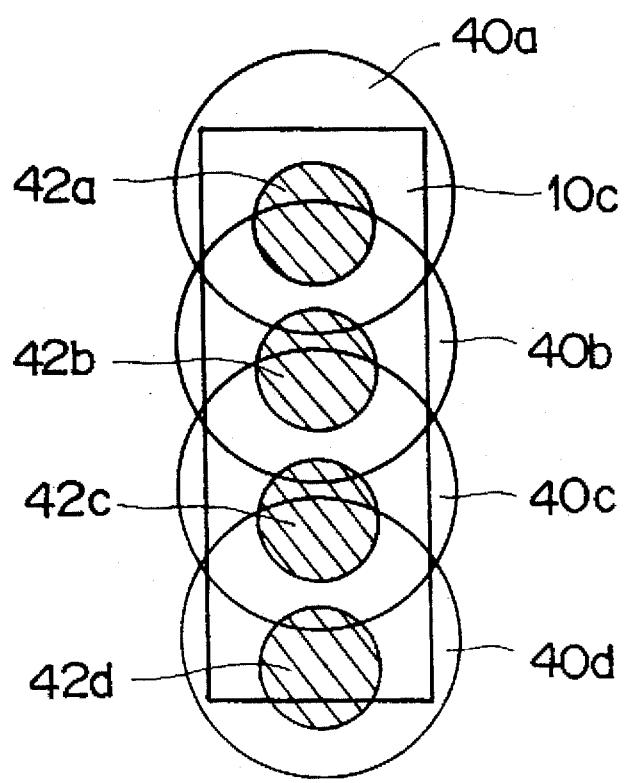
FIG. 11 is a view showing a case wherein the center of each of the second ink dots is shifted from the center of a corresponding one of the first ink dots.

As shown in FIG. 11, the second ink may be sprayed such that the center of the second ink dot is shifted from that of the first ink dot. In this case as well, the same effect as described above can be obtained.

Examples in which color filters are manufactured by the above method will be described next.

EXAMPLE 1

Formation of light-shielding grating

A thin chromium (Cr) film 200 by 200 mm square was formed, by sputtering, on a surface-polished glass substrate consisting of non-alkali glass to have a thickness of about 2000 angstroms. The film was then patterned into a shape like the one shown in FIG. 1A by photolithography. In this case, the dimensions of the matrix pattern were: W=60 μm; L=140 μm; d1=20 μm; and d2=100 μm in FIG. 1A.

Formation of layer to be dyed

A resin composition consisting of hydroxypropyl cellulose (HPC-H available from Nihon Soda) was spin-coated on the glass substrate on which the light-shielding grating was formed. The resultant structure was dried at 90° C. for 10 minutes to form a 2-μm thick layer to be dyed.

First coloring operation

The above layer was colored by the ink-jet head described above.

An ink having the following composition was used:

| | |
|---|---|
| ethylene glycol: | 20 wt % |
| isopropyl alcohol: | 5 wt % |
| dye: | 3 wt % |
| water: | 72 wt % |

The following dyes were used:
R (red) dye: color mixture of
Acid Red CI 35/Acid Yellow CI 23
G (green) dye: color mixture of
Acid Blue CI 9/Acid Yellow CI 23
B (blue) dye: color mixture of
Acid Blue CI 9/Acid Red CI 35

The measured surface tension of the above ink was 48 dyne/cm. The viscosity of the ink was 1.8 cps. The initial contact angle of the ink was 30°. The first ink discharging operation was performed by the ink-jet head using such an ink. The volume of an ink droplet was 45 pl, and the average diameter of ink dots formed on the layer was 82 μm.

Second coloring operation

Droplets of an ink having the same composition as that of the ink sprayed for the first time were sprayed on the ink dots, which were formed by the first droplet discharging operation, by using the same ink-jet head. In this case, the volume of an ink droplet was 35 pl. The average diameter of ink dots formed on the layer after the second ink spraying operation was 82 μm, which was equal to the average diameter in the first coloring operation. As a result, a proper coloring operation was performed without causing any color mixing between adjacent opening portions of the light-shielding grating and any white omission.

Coating of protective layer

A thermoset resin (Hicoat LC2001 available from SANYO CHEMICAL INDUSTRIES, LTD.) was coated, as a transparent protective film, on the layer, on which R, G, and B patterns were formed in the above manner, by a spinner so as to have a thickness of 0.5 μm after it was dried. The resultant structure was pre-baked at 120° C. for 30 minutes first, and then baked at 200° C. for 30 minutes, thereby forming a protective layer. With this process, a color filter was completed.

Formation of liquid crystal panel

A series of operations, e.g., formation of ITO and aligning films and sealing of a liquid crystal material, was performed by using the color filter obtained in the above manner, thereby forming a color liquid crystal display apparatus.

In Example 1, as described above, an excellent color liquid crystal display apparatus was obtained without causing any color mixing among the pixels of a color filter and any white omission.

(Comparative Example 1)

The first coloring operation for a layer to be dyed was performed following the same procedures, the same materials, and the same conditions as those in Example 1. The volume of an ink droplet in the second coloring operation was set to be 45 pl, which was equal to the volume of an ink droplet in the first coloring operation.

The average diameter of ink dots formed on the layer by the second coloring operation became 90 μm. As a result, blurring of the ink occurred. For this reason, color mixing occurred between adjacent opening portions at a portion of a color filter. That is, an excellent color filter could not be manufactured.

According to the above description, the concentration of ink in the second coloring operation may be increased to prevent blurring of the ink. In contrast to this, an example in which the concentration of ink in the second coloring operation is decreased to adjust the color density of a color filter will be described below. In this case, since the ink concentration in the second color operation is low, the ink blurs more easily. In order to cope with such a phenomenon, the volume of an ink sprayed in the second color operation is decreased as in Example 1.

EXAMPLE 2

The first coloring operation of a layer to be dyed was performed following the same procedures, the same material, and the same conditions as those in Example 1. The composition of the ink sprayed in the second color operation was set as follows:

| ethylene glycol: | 20 wt % |
|---|---|
| isopropyl alcohol: | 5 wt % |
| dye: | 1.5 wt % |
| water: | 72 wt % |

The following dyes were used:

R (red) dye: color mixture of

Acid Red CI 35/Acid Yellow CI 23

G (green) dye: color mixture of

Acid Blue CI 9/Acid Yellow CI 23

B (blue) dye: color mixture of

Acid Blue CI 9/Acid Red CI 35

The measured surface tension of the above ink was 49 dyne/cm. The viscosity of the ink was 1.7 cps. The initial contact angle of the ink was 30°.

The second ink discharging operation was performed by the ink-jet head using such an ink. The volume of an ink droplet was 35 pl, which was equal to that in Example 1. The average diameter of ink dots formed on the layer by the first and second ink discharging operations was 82 µm, which was equal to that in Example 1.

The object of Example 2 is to adjust the color density of a color filter without causing blurring of ink dots. According to Example 2, a color filter having a color density lower than that in Example 1 was manufactured.

The color density of a filter can be finely adjusted by changing the densities of inks in the first and second coloring operations.

As described above, according to the above embodiment, in coloring a color filter by spraying ink using the ink-jet head, the amount of ink discharged in the second coloring operation is set to be smaller than that of ink discharged in the first coloring operation, thereby manufacturing a high-definition color filter while preventing ink blurring.

In addition, by setting different ink concentrations in the first and second coloring operations, the color density of a color filter can be finely adjusted.

(Second Embodiment)

In the first embodiment, ink droplets are discharged twice. In the second embodiment, ink droplets are discharged three times or more.

In performing the third discharging operation, the volume of an ink droplet discharged was set to be slightly smaller than that in the second discharging operation. With this operation, the diameter of an ink dot formed on a layer to be dyed became equal to that of an ink dot formed in advance. By discharging ink three times, a color filter having a higher color density was manufactured.

In this embodiment, the volume of an ink droplet discharged for the third time was smaller than that for the second time. However, an excellent result was obtained with the same volume of an ink droplet as that in the second discharging operation.

(Third Embodiment)

In this embodiment, an ink-jet head of a so-called multi-nozzle type having a plurality of discharging openings is used to shorten the manufacturing time. In order to reduce variations in the volume of ink discharged from the plurality of discharging openings, the ink is discharged from different discharging openings onto the same element in the first and second discharging operations, as shown in FIG. 12.

Figure 12:
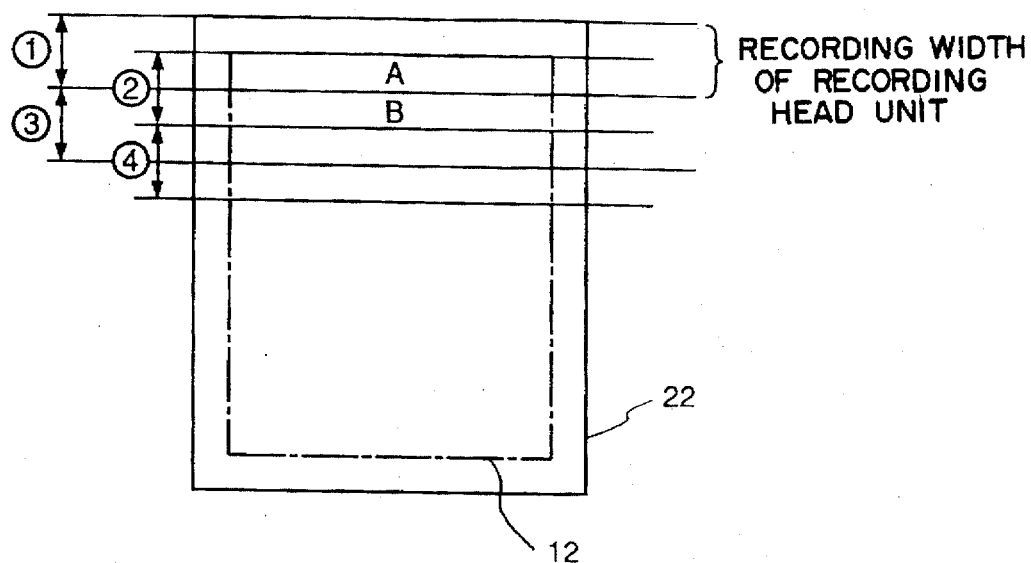
FIG. 12 is a view showing how a filter is colored by a multi-nozzle type ink-jet head.

For the sake of descriptive convenience, FIG. 12 shows as if the recording head scanned. Referring to FIG. 12, by performing a scanning operation in the direction of width by a width corresponding to half of the number of discharging openings, ink is sprayed on the same element by using the lower half of discharging openings and the upper half of discharging openings. For example, an element in a region A is formed by using the lower half of discharging openings in scan and the upper half of discharging openings in scan.

Figure 13:
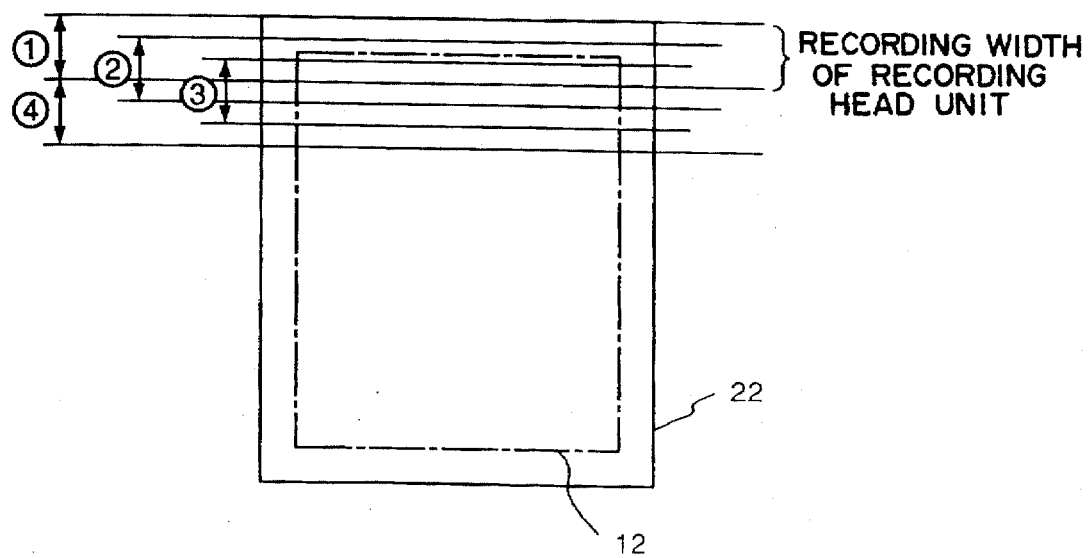
FIG. 13 is a view showing how a filter is colored by the multi-nozzle type ink-jet head.

With the above process, the different volumes of ink droplets discharged from the respective discharging openings were averaged, a color filter having less density irregularity was formed. FIG. 13 shows a case wherein ink is sprayed on the same element three times.

Various changes and modifications of the above embodiments can be made without departing the scope and spirit of the invention.

For example, in the above embodiments, the ink-jet head is fixed, and the X-Y stage is moved. However, the ink-jet head may be moved while the stage is fixed.

As the ink-jet head, a so-called piezoelectric type head using mechanical energy converters such as piezoelectric elements may be used. In this case, the volume of the ink discharged can be easily adjusted by adjusting the applied voltage of a driving pulse. When a bipolar driving operation is to be performed, the ink volume can be adjusted by adjusting both or either of bipolar driving pulses.

The present invention can be applied to a single-color filter and a filter of a type having a plurality of single-color filters of different colors stacked on each other.

In the above embodiments, each droplet is sprayed on the same spot twice. However, each droplet may be sprayed on the same spot three times or more.

According to the above description, the volume of a droplet discharged is controlled by changing a driving pulse applied to a heat energy converter. However, a plurality of ink-jet heads may be used in such a manner that a large pulse is applied to one head, while a small pulse is applied to the other head.

According to the above description, the present invention is applied to the print apparatus of the system, among various ink-jet recording systems, which has a means (e.g., an electricity-to-heat converter or laser light) for generating heat energy as energy used to discharge an ink, and changes the state of an ink by using the heat energy. According to this system, a high-density, high-definition recording operation can be realized.

As for the typical structure and principle, it is preferable that the basic structure disclosed in, for example, U.S. Pat. No. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place, are applied to the electricity-to-heat converter in accordance with recording information so as to generate heat energy in the electricity-to-heat converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while exhibiting excellent responsiveness.

It is preferable that a pulse drive signal disclosed in U.S. Pat. No. 4,463,359 or U.S. Pat. No. 4,345,262 is employed. If conditions disclosed in U.S. Pat. No. 4,313,124, which is an invention relating to the temperature rising ratio at the heat effecting surface, are employed, a satisfactory recording result can be obtained.

As an alternative to the structure (linear fluid passage or perpendicular fluid passage) of the recording head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. No. 4,558,333 or U.S. Pat. No. 4,459,600 may be employed. In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferred additionally to employ the recording head restoring means and the auxiliary means provided as the component of the present invention because the effect of the present invention can be further stabilized. Specifically, it is preferable to employ a recording head capping means, a cleaning means, a pressurizing or suction means, an electricity-to-heat converter, another heating element or a sub-heating means constituted by combining them and a sub-emitting mode in which an emitting is performed independently from the recording emitting in order to stably perform the recording operation.

Although a fluid ink is employed in the aforesaid embodiment of the present invention, ink which is solidified at the room temperature or lower as well as ink which is softened at the room temperature, ink that is in the form of a fluid at the room temperature, or ink which is formed into a fluid when the recording signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, ink which is solidified when it is caused to stand, that is liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, ink which is liquified when heat energy is supplied in accordance with a recording signal so as to be discharged in the form of fluid ink, or ink which is liquified only after heat energy is supplied, e.g., ink which starts to solidify when it reaches a recording medium, can be adapted to the present invention. In the aforesaid case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is most preferred for ink to be adapted to the aforesaid film boiling method.

As has been described, according to the present invention, in coloring a color filter, color irregularity in the color filter can be prevented by spraying a droplet on the same spot on a substrate a plurality of times.

In addition, the volume of a droplet discharged first time is set to be different from that of a droplet discharged a second time. With this operation, the volumes of droplets can be set in consideration of blurring of the droplets in such a manner that the size of a dot formed by the first droplet becomes almost equal to that of a dot formed by the second droplet. Therefore, the spread of each droplet can be prevented, and a high-definition color filter can be manufactured.

Furthermore, since an ink-jet head is used to spray droplets, a filter can be colored in R, G, and B in the process of scanning the ink-jet head. Therefore, unlike the prior art, the same process need not be repeated for each color of R, G, and B, and the manufacturing cost of a color filter can be reduced.

Moreover, the composition of a coloring material in droplets discharged the first time is made different from that of a color material in droplets discharged the second time. If, for example, droplets containing a coloring material at different concentrations are sprayed, the pixel density of a color filter can be adjusted. The degree of blurring of an ink can also be adjusted by using different solvents and changing the wettability.

The present invention is not limited to the above embodiments and various changes and modifications can be made within the spirit and scope of the present invention. Therefore, to apprise the public of the scope of the present invention the following claims are made.

What is claimed is:

1. A manufacturing method for a color filter manufactured by forming and arranging colored filter elements on a transparent substrate, comprising:

a first discharge step of discharging a colored droplet of a first volume onto each of a plurality of filter element formation regions on the substrate so as to form each of the filter elements; and a second discharge step of discharging a colored droplet of a second volume smaller than the first volume onto a position on the substrate where the colored droplet of the first volume has been discharged, wherein the diameter of an ink dot formed at said first discharge step and the diameter of an ink dot formed at said second discharge step are substantially equal.

2. The method according to claim 1, further comprising a formation step of forming a light-shielding portion on the substrate to partition the filter element formation regions before the first discharge step.

3. The method according to claim 1, wherein the ink-jet head is a head for discharging colored droplets by using heat energy, the head having a heat energy converter for generating heat energy applied to the colored droplets.

4. The method according to claim 3, wherein a volume of each of the discharged colored droplets is controlled by changing a driving pulse applied to the heat energy converter.

5. The method according to claim 4, wherein the volume of each of the discharged colored droplets is controlled by selectively using a plurality of heads designed to apply different driving pulses to the heat energy converter.

6. The method according to claim 1, wherein the filter elements are colored in different colors.

7. The method according to claim 1, wherein the colored droplets of the first and second volumes are discharged from a head having a plurality of discharging openings, the colored droplets of the first and second volumes being discharged from different discharging openings, respectively.

8. A manufacturing method for a color filter manufactured by forming and arranging a plurality of colored filter elements on a transparent substrate, said method comprising:

a first discharge step of discharging a first colored droplet into each of a plurality of filter element formation regions on the substrate so as to form each of the filter elements; and a second discharge step of discharging a second colored droplet containing a coloring material whose composition is different from that of a coloring material in the first colored droplet onto a position on the substrate where the first colored droplet has been discharged, wherein the diameter of an ink dot formed by said first discharge step and the diameter of an ink dot formed after said second discharge step are substantially equal.

9. The method according to claim 8, wherein the first and second colored droplets contain coloring materials at different concentrations.

10. The method according to claim 9, wherein the concentration of the coloring material in the second colored droplet is higher than that of the coloring material in the first colored droplet.

11. The method according to claim 8, wherein the ink-jet head is a head for discharging colored droplets by using heat energy, the head having a heat energy converter for generating heat energy applied to the colored droplets.

12. The method according to clam 8, further comprising a formation step of forming a light-shielding portion on the substrate to partition the filter element formation regions before said first discharge step.

13. The method according to claim 8, wherein the filter elements are colored in different colors.

14. The method according to claim 8, wherein the colored droplets of the first and second volumes are discharged from a head having a plurality of discharging openings, the droplets of the first and second volumes being discharged from different discharging openings, respectively.

* * * * *

UNITED STATES PATENT AND TRADEMARK OFFICE
CERTIFICATE OF CORRECTION

PATENT NO. : 5,670,205　　　　　　　　　　　　　　　　　　　　　　　　Page 1 of 1
DATED : September 23, 1997
INVENTOR(S) : Takeshi Miyazaki et al.

It is certified that error appears in the above-identified patent and that said Letters Patent is hereby corrected as shown below:

<u>Title page,</u>
Item [56], References Cited, OTHER PUBLICATIONS, insert -- Patents Abs. of Japan, vol. 17, no. 372 (P-1573), 13 July 1993. --.

<u>Column 1,</u>
Line 26, "method" (first occurrence) should read -- method discussed --;
Line 27, delete "discussed".

<u>Column 15,</u>
Line 24, "4,313,124" should read -- 4,313,134 --.

<u>Column 16,</u>
Line 14, "that" should read -- and that --.

Signed and Sealed this

Sixth Day of August, 2002

*Attest:*

JAMES E. ROGAN
*Attesting Officer*　　　*Director of the United States Patent and Trademark Office*